United States Patent
Chen

(10) Patent No.: US 9,497,482 B2
(45) Date of Patent: Nov. 15, 2016

(54) METHODS FOR COMPARING A TARGET BLOCK TO A REFERENCE WINDOW FOR MOTION ESTIMATION DURING VIDEO ENCODING

(71) Applicant: Amlogic Co., Ltd., Santa Clara, CA (US)

(72) Inventor: Shi Chen, Cupertino, CA (US)

(73) Assignee: Amlogic Co., Limited, Santa Clara, CA (US)

( * ) Notice: Subject to any disclaimer, the term of this patent is extended or adjusted under 35 U.S.C. 154(b) by 452 days.

(21) Appl. No.: 14/044,739

(22) Filed: Oct. 2, 2013

(65) Prior Publication Data

US 2015/0092835 A1    Apr. 2, 2015

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 19/53* | (2014.01) | |
| *H04N 19/43* | (2014.01) | |

(52) U.S. Cl.
CPC .............. *H04N 19/53* (2014.11); *H04N 19/43* (2014.11)

(58) Field of Classification Search
CPC .... H04N 19/53; H04N 19/43; H04N 19/427; H04N 19/433; H04N 19/51
USPC ........................................ 375/240.01–240.29
See application file for complete search history.

(56) References Cited

U.S. PATENT DOCUMENTS

| | | | | |
|---|---|---|---|---|
| 6,263,025 B1* | 7/2001 | Iizuka | ................ | H04N 19/527 348/699 |
| 2005/0138532 A1* | 6/2005 | Park | ...................... | H04N 19/51 714/776 |
| 2009/0103621 A1* | 4/2009 | Numata | ............... | G06T 7/2013 375/240.16 |
| 2009/0202164 A1* | 8/2009 | Rossato | .............. | H04N 19/105 382/238 |
| 2010/0309991 A1* | 12/2010 | Schoenblum | ......... | H04N 19/51 375/240.29 |

* cited by examiner

*Primary Examiner* — Mehrdad Dastouri
*Assistant Examiner* — Jared Walker
(74) *Attorney, Agent, or Firm* — Venture Pacific Law, PC

(57) ABSTRACT

A method for comparing a target block to a reference window in motion estimation calculations, comprises the steps of: determining SAD calculations as a function of the target block and the reference window; reading the target block into registers; reading a segment of the reference window; updating the determined SAD calculations on the fly as a function of the read target block and the read segment of the reference window; and determining one or more sub-blocks of the reference window having minimum SAD values as a function of the updated SAD calculations; and if one or more of the minimum SAD values are not found, repeating the reading a segment step, the updating step and the determining step for a next segment of the reference window.

18 Claims, 5 Drawing Sheets

METHODS FOR COMPARING A TARGET BLOCK TO A REFERENCE WINDOW FOR MOTION ESTIMATION DURING VIDEO ENCODING

FIELD OF INVENTION

This invention generally relates to video encoding, and, in particular, to comparing a target block to a reference window for motion estimation.

BACKGROUND

Motion estimation is used for increasing compression efficiency by removing temporal redundancy of input video data in a video coder. General standards for compressing a moving picture are mostly based on block-based coders. Such block-based coders use a block matching algorithm. The block matching algorithm performs block-based motion estimation. According to the block matching algorithm, a block most similar to a certain block in a target image is selected from candidate blocks positioned within a search area of a reference image. Here, the relative local difference between the block to be processed in the target image and the most similar candidate block in the reference image is referred to as a motion vector (MV). Generally, the sum of absolute differences ("SAD") is calculated for motion estimation.

When a motion estimator is actually designed based on such calculation, the performance and the amount of operation of motion estimation should be considered. For motion estimation, most of the amount of operation is for calculation of the SAD. In other words, subtraction, calculation of an absolute value and a cumulative operation should be performed to calculate each of the SAD for each sub-block in the reference image. In particular, the amount of such calculation is proportional to the size of a block to be processed. According to conventional motion estimation method, it takes a great amount of time and processing power to estimate motion since the SAD operations require a significant amount of time and processing power.

Currently, a hierarchical motion estimation method is used in which the reference image and target image are down sampled before conducting the SAD calculations and comparison of sub-blocks for the reference image and the target image. FIG. 1 illustrates a down sampled reference image and a down sampled target image. According to the hierarchical motion estimation method, a reference image 20 is down sampled to a middle layer 22. The middle layer is down sampled to a lower layer 24. Typically, the lower layer 24 is about 32-pixels by 32-pixels.

Similarly, a 16-pixels by 16-pixels block 28 of the target image 26 is down sampled to a middle layer 30. The middle layer 30 is further down sampled to a target block 32. The target block 32 can be 4-pixels by 4-pixels ("4×4"). Typically, the target block is compared to each sub-block in the lower layer 24 of the reference image. Since the lower layer has 32-pixels by 32-pixels, there are about 841 possible 4×4 sub-blocks within the lower layer 24. Thus, the target block is compared to about 841 sub-blocks of the lower layer 24.

In order to compare the target block to each of the sub-blocks of the lower layer 24, a SAD value can be calculated for each of the comparisons. The corresponding sub-block of the lower layer 24 having the minimum SAD value can be identified as the most similar to the target block 32. Next, the sub-block is up-sampled to an area of the middle layer 22. Additional SAD calculations are performed between the middle layers 22 and 30 to determine the most similar sub-block in the middle layer 22 to the middle layer 30. Once the most similar block is identified, that most similar block is up-sampled to an area of the reference image 20. The block 28 of the target image 26 is further compared to the area of the reference image 20 for identifying the most similar sub-block in the reference image 20.

In total, the number of SAD calculations can range in the hundreds to the thousands depending on the size of the reference image and the target image, thus a motion estimation processor can expend a large amount of time. Typically, the motion estimation processor will calculate one SAD calculation at a time, by reading the pixel data for the sub-block of the lower layer 24 and the target block 32, calculating the SAD calculation, storing that SAD value for that comparison, and calculating a next SAD calculation for the next sub-block of the lower layer 24 to be compared. Once all the SAD values are calculated, the minimum is chosen as the most similar sub-block of the lower layer 24 to the target block. This process is very time consuming. Therefore, there exists a need to further improve such method to enhance performance to quickly identify a similar sub-block of the lower layer to a target block.

SUMMARY OF INVENTION

An object of this invention is to provide methods for calculating SAD values on the fly to compare a target block to sub-blocks of a reference window.

Another object of this invention is to provide methods for comparing a target block to sub-blocks of a reference window using a scanning pattern.

Yet another object of this invention is to provide methods for operating a motion estimation processor for calculating SAD values.

Briefly, the present invention discloses methods and systems for comparing a target block to a reference window in motion estimation calculations, comprising the steps of: determining SAD calculations as a function of the target block and the reference window; reading the target block into registers; reading a segment of the reference window; updating the determined SAD calculations on the fly as a function of the read target block and the read segment of the reference window; and determining one or more sub-blocks of the reference window having minimum SAD values as a function of the updated SAD calculations; and if one or more of the minimum SAD values are not found, repeating the reading a segment step, the updating step and the determining step for a next segment of the reference window.

An advantage of this invention is that methods for calculating SAD values on the fly are provided to compare a target block to sub-blocks of a reference window.

Another advantage of this invention is that methods for comparing a target block to sub-blocks of a reference window using a scanning pattern are provided.

Yet another advantage of this invention is that methods for operating a motion estimation processor are provided for calculating SAD values.

DESCRIPTION OF THE DRAWINGS

The foregoing and other objects, aspects, and advantages of the invention can be better understood from the following detailed description of the preferred embodiment of the invention when taken in conjunction with the accompanying drawings.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
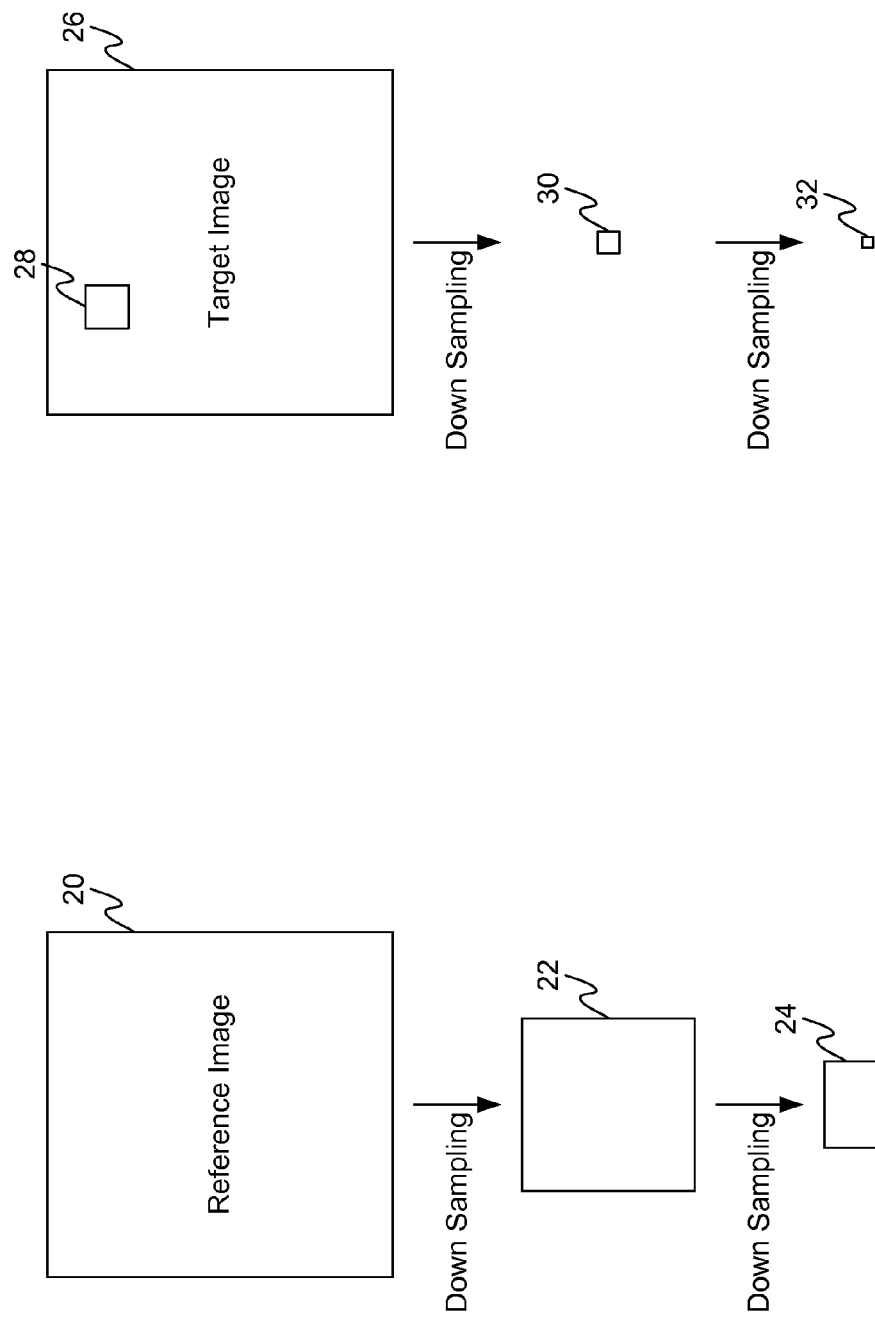
FIG. 1 illustrates a down sampled reference image and a down sampled target image.
Figure 2:
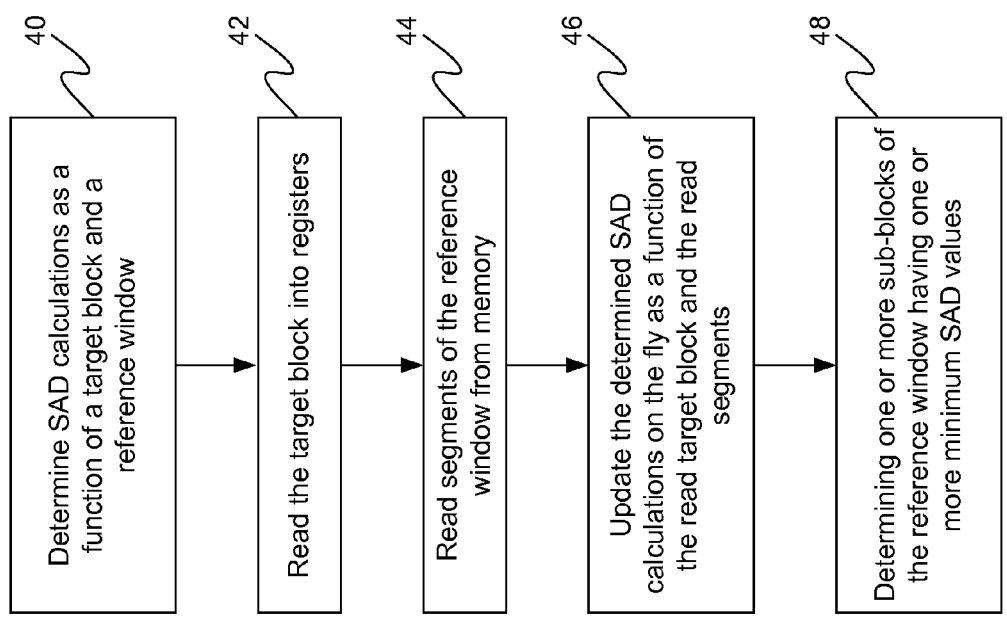
FIG. 2 illustrates a flow chart of the present invention for comparing a target block with a reference window.

FIG. 2 illustrates a flow chart of the present invention for comparing a target block with a reference window. SAD calculations must be determined 40 as a function of a target block and a reference window. In particular, a SAD calculation must be determined to compare each of the sub-blocks of the reference window to the target block. The reference window can have numerous sub-blocks depending on how the sub-blocks are formed and sized.

Figure 3:
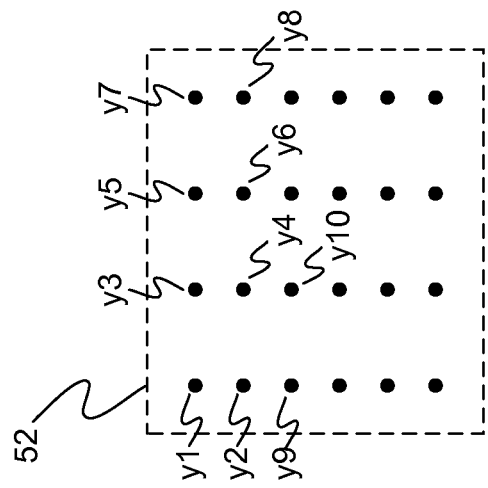
FIG. 3 illustrates a target block and a reference window for determining SAD calculations in accordance with the present invention.
Figure 3:
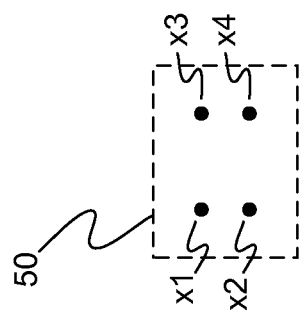

FIG. 3 illustrates an example of a target block and a reference window for determining SAD calculations in accordance with the present invention. A target block 50 comprises pixels x1, x2, x3, and x4. The reference window 52 comprises multiple pixels (e.g., pixels y1-y9). The sub-blocks of the reference window 52 can be grouped into blocks of four pixels, where each of the sub-blocks is shifted by one pixel along the rows and/or columns of the reference window 52.

Every sub-block of four pixels in the reference window 52 can have an associated SAD calculation to compare that sub-block to the target block 50. For instance, a first sub-block of the reference window 52 comprises pixels y1, y2, y3, and y4; a second sub-block of the reference window 52 (shifted one pixel along the columns of the reference window 52) comprises pixels y3, y4, y5, and y6; a third sub-block of the reference window 52 comprises pixels y5, y6, y7, and y8; a fourth sub-block of the reference window 52 comprises pixels y2, y9, y4, and y10; and so on and so forth, such that all block groupings of four pixels in the reference window 52 are identified.

For each of the sub-blocks, a SAD calculation must be determined. Thus, to compare the first sub-block to the target block 50, the following SAD calculation for the first sub-block is equal to:

$$SAD_1 = |x1-y1| + |x2-y2| + |x3-y3| + |x4-y4| \qquad \text{Equation [1]}.$$

To compare the second sub-block to the target block 50, the following SAD calculation for the second sub-block is equal to:

$$SAD_2 = |x1-y3| + |x2-y4| + |x3-y5| + |x4-y6| \qquad \text{Equation [2]}.$$

To compare the third sub-block to the target block 50, the following SAD calculation for the third sub-block is equal to:

$$SAD_3 = |x1-y5| + |x2-y6| + |x3-y7| + |x4-y8| \qquad \text{Equation [3]}.$$

To compare the fourth sub-block to the target block 50, the following SAD calculation for the fourth sub-block is equal to:

$$SAD_4 = |x1-y2| + |x2-y9| + |x3-y4| + |x4-y10| \qquad \text{Equation [4]}.$$

The other sub-blocks within the reference window 50 can also be used to calculate a corresponding SAD calculation for each of the other sub-blocks.

It is understood by a person having ordinary skill in the art that the sub-blocks can comprise any number of pixels to match the target block 50. Also, the sub-blocks of the reference window can also comprise any number of pixels and can be shifted from other sub-blocks by a fraction of a pixel or by integer values of the pixels. Additionally, the SAD calculations can be weighted as a function of any previously determined sub-block having a minimum SAD calculation, a skip flag for any of the sub-blocks of the reference window, and/or other factors taken into account by the SAD calculations. The examples herein are not meant to be limiting in any manner, and are for illustration purposes only.

As illustrated in Equations [1]-[4], pixel data (e.g., luma, chroma, or other video characteristic data for each pixel) can be used in the SAD calculations to compare the sub-blocks of the reference window 50 to the target block 52. Therefore, pixel data can be read once by the processor and used to partially calculate all SAD calculations that use such pixel data. For instance, the pixel y4 of reference window 52 is used for the $SAD_1$, $SAD_2$, and $SAD_4$. The processor can read and store the pixel y4 data and partially calculate the $SAD_1$, $SAD_2$, and $SAD_4$. Since the $SAD_1$, $SAD_2$, and $SAD_4$ may not be fully calculated since there are other pixels from the reference window 52 that may need to be read and processed. Therefore, the processor will continue to process pixels of the reference window 52 and until the SAD calculations are complete.

Referring to FIG. 2, since each pixel of the reference window may be used in multiple SAD calculations, it is important that each pixel of the reference window is read once by the processor to calculate the multiple SAD calculations. In this manner, overall efficiency is greatly improved.

The target block can be read into the registers of the processor 42. A target block can comprise a 4×4 block of pixels, which amounts to 16 pixels spread over four rows and four columns. The luma data (or other video characteristic) for the 16 pixels can be read and stored in the registers of the processor.

Segments of the reference window can be read 44 from memory (e.g., DRAM or other external memory to the processor). The segments are read and processed one at a time by the processor. Each of the segments can be a predefined number of consecutive pixels of the reference window along the same row of the reference window. The pre-defined number of pixels to use for each segment can be dependent upon the size of the reference window, the size of the target block, hardware considerations of the processor, system performance requirements, and other system factors.

After each of the segments is read, the processor can perform partial SAD calculations using the currently read segment and update SAD calculations that use the read pixels from the currently read segment 46. For instance, if a first segment is read by the processor, the processor can use the pixel data of the first segment to partially calculate all the SAD calculations that use the pixel data of the first segment. Since the SAD calculations require pixel data from various rows of the reference window, some of the SAD calculations may not be completed since some of the pixel data necessary to complete the calculation have not been read and processed by the processor. The SAD calculations can be updated on the fly as each of the segments is read and processed. Thus, the SAD calculations are continuously updated until the SAD calculations are completed or one of the completed SAD calculations is below a predefined threshold.

Once one or more SAD calculations are completed, it is determined whether the corresponding one or more sub-blocks of the reference window for the completed SAD calculations are one or more minimum SAD values 48.

To determine one or more minimum SAD values, the values for the completed SAD calculations can be compared to the predefined threshold. If one of the completed SAD values is below the predefined threshold, then the corresponding sub-block for that SAD value can be identified as having a minimum SAD value. In other words, that corresponding sub-block can be flagged as being the most similar sub-block of the reference window to the target block, and thereby used for motion estimation.

Otherwise, if none of the completed SAD calculations are below the predefined threshold, then a predefine number of the lowest SAD calculations are used for motion estimation. For instance, the two lowest SAD calculations can be used for motion estimation. However, if the two lowest SAD calculations are close in proximity to each other, then a single one of them can be chosen to be used for motion estimation.

Figure 4:
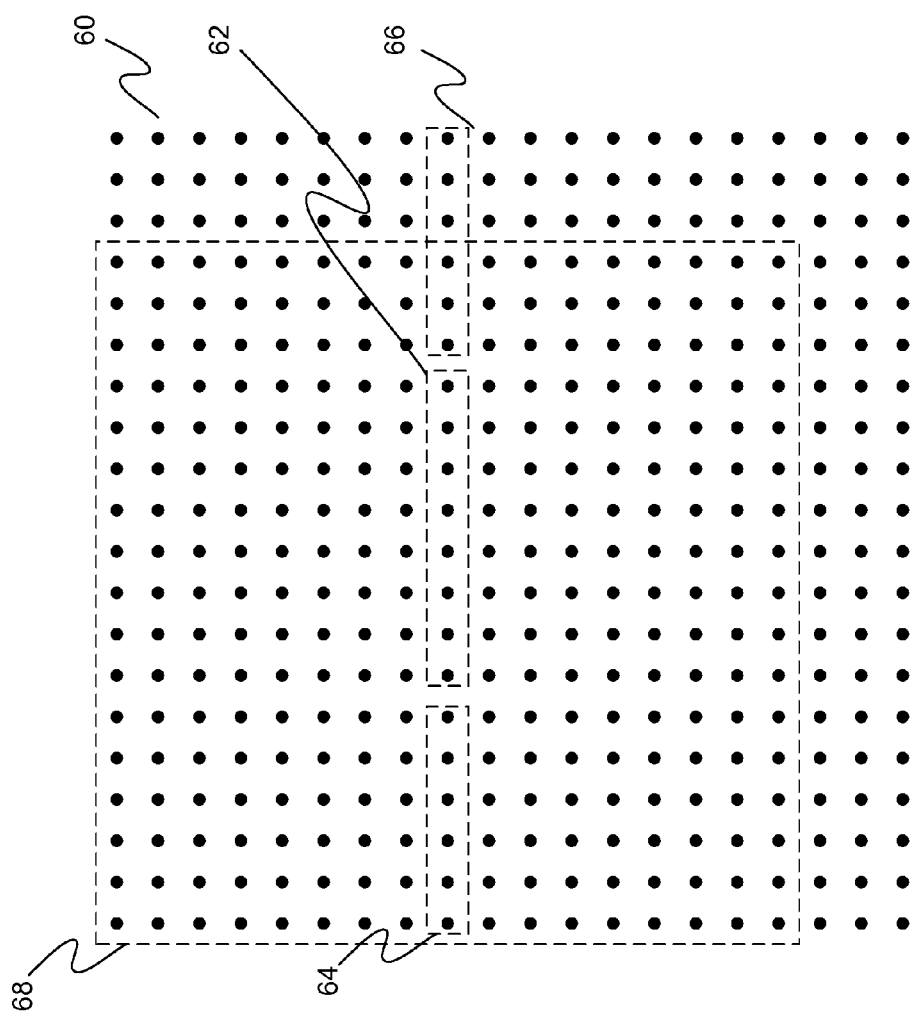
FIG. 4 illustrates a reference window of 20 pixels by 20 pixels of the present invention.

FIG. 4 illustrates a reference window of 20 pixels by 20 pixels of the present invention. A reference window 60 can be a down-sampled reference image. The reference window comprises 20 rows of pixels by 20 columns of pixels, forming a 20×20 array of pixels. As understood by a person having ordinary skill in the art, the size of the reference window can vary depending on the performance needs and system requirements. Therefore, it is understood that the present invention can be used for other sized reference windows. The current example is for illustration purposes, and is not meant to limit the invention in any way.

Each sub-block of the reference window 60 can be compared to a target block (not shown) by calculating a SAD value for each sub-block of the reference window 60 compared to the target block. The sub-block having the minimum SAD value can be determined to be the most similar sub-block of the reference window 60 to the target block. A SAD value can be calculated by summing the absolute differences of pixels in the sub-block with pixels in the target block.

In order to calculate the SAD values, a processor (e.g., a motion estimation processor) can read a segment of pixels from the reference window 60 and use the data for that segment to perform the subtraction operation for multiple SAD calculations for any SAD calculations that use the pixels of the read segment. For instance, a next segment can be read by the processor and any further SAD calculations that need the pixels of the read segments can use the data and update the SAD calculations with that information. The processor reads the segments in a scanning pattern. While reading the segments, certain ones of the SAD calculations can be completed and compared to a threshold to determine whether the corresponding sub-block of the reference block 60 can be used as the most similar sub-block to the target block.

If all the segments of the reference window 60 are read and no SAD values are below the threshold, then sub-blocks having a predefined number of the lowest values of the SAD calculations can be identified as similar sub-blocks to the target block.

To perform a SAD calculation for any sub-block of the reference window 60, the pixels of the sub-blocks must be read into the processor. However, to reuse read pixel data for other calculations, a segment of pixels can be read by the processor, and then used for all SAD calculations that involve the pixels of that segment. A next segment can be read into the processor. Next, the pixels of the next segment are used for all the SAD calculations that involve those pixels, and so on and so forth until all the segments of the reference window 60 are read. In this manner, the entire reference window can be read in to the processor until all the SAD calculations are performed.

The scanning pattern for reading pixels of the reference window 60 into the processor can start at a middle row of the reference window (e.g., row 8) and work outwards from there until all the pixels of the entire reference window have been read by the processor. Each row of the reference window 60 can be partitioned into a predefined number of segments for reading into the processor. For instance, row 8 of the reference window can be partitioned into three segments 62, 64, and 66. The middle segment 62 having 8 pixels can be read first by the processor. After the processor is finished with processing the pixels in the middle segment 62, the left segment 64 can be read and processed by the processor. After the left segment 64 is processed, the right segment 66 can be read and processed by the processor. Next, the processor can process a next line in a similar manner until all the lines of pixels of the reference window 60 are processed.

Assuming that each sub-block is shifted one pixel away from each other and the target block is 4-pixels by 4-pixels, the number of sub-blocks in the reference window equal the number of pixels in an area 68, which can be about 289. Thus, there may be about 289 SAD calculations to compare the target block to the reference window 60.

Figure 5:
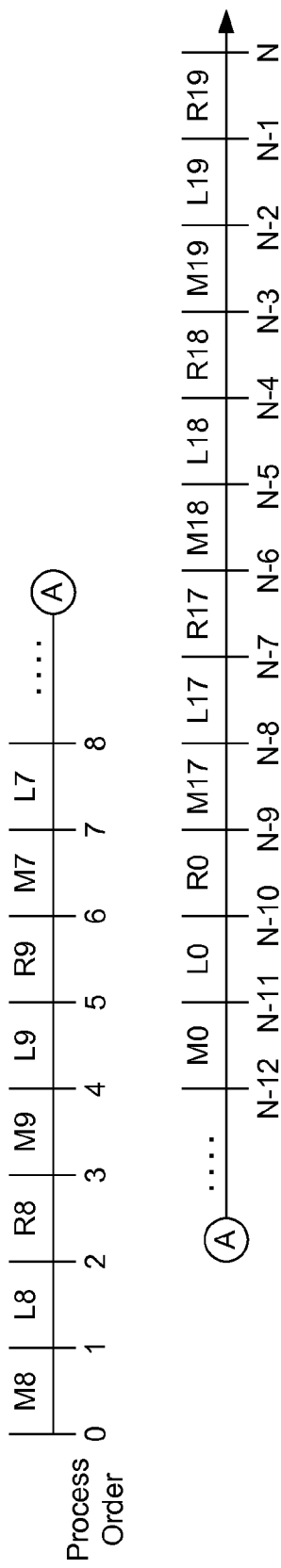
FIG. 5 illustrates a process order of the present invention for processing the segments of a reference window.

FIG. 5 illustrates a process order for processing the segments of a reference window. Assuming the reference window is 20 pixels by 20 pixels, a target block is 4 pixels by 4 pixels, and each row of the reference window has three segments, then a processor of the present invention can read and the process the pixels of each segment in the following order:

(1) pixels of a middle segment of row 8 ("M8") of the reference window are read and processed for the SAD calculations using those read pixels;

(2) pixels of a left segment of row 8 ("L8") of the reference window are read and processed for the SAD calculations using those read pixels;

(3) pixels of a right segment of row 8 ("R8") of the reference window are read and processed for the SAD calculations using those read pixels;

(4) pixels of a middle segment of row 9 ("M9") of the reference window are read and processed for the SAD calculations using those read pixels;

(5) pixels of a left segment of row 9 ("L9") of the reference window are read and processed for the SAD calculations using those read pixels;

(6) pixels of a right segment of row 9 ("R9") of the reference window are read and processed for the SAD calculations using those read pixels;

(7) pixels of a middle segment of row 7 ("M7") of the reference window are read and processed for the SAD calculations using those read pixels;

(8) pixels of a left segment of row 7 ("L7") of the reference window are read and processed for the SAD calculations using those read pixels; and etc.

Thus, each row of the reference window is read and processed in alternating fashion, starting from a middle row, e.g., row 8. Within each row, the three segments can be read successively until all the pixels of the row are read and processed for SAD calculations. After pixels of a right segment of row 0 ("R0") of the reference window are read and processed for the SAD calculations using those read pixels, the segments in the remaining rows 17, 18, and 19 can be read and processed for the SAD calculations.

Since pixels are read row by row, some SAD calculations cannot be completed since the SAD calculations may need information from pixels in different rows. Thus, upon initiation of the scanning pattern, SAD calculations cannot be completed. However, any new read pixels can be used to update the SAD values until the SAD calculations are completed.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

I claim:

1. A method for comparing a target block to a reference window in motion estimation calculations, comprising the steps of:
   determining SAD calculations as a function of the target block and the reference window, wherein the determined SAD calculations are calculated by summing the absolute differences of pixel data of the target block and pixel data of the reference window;
   reading the target block into registers;
   reading a segment of the reference window, wherein the reference is an array of pixels, wherein each row of the array of pixels is partitioned into a left segment, a middle segment, and a right segment, and wherein an order that the segments are read by a processor is as follows: the middle segment, the left segment, and the right segment;
   updating the determined SAD calculations on the fly as a function of the read target block and the read segment of the reference window;
   determining one or more sub-blocks of the reference window having minimum SAD values as a function of the updated SAD calculations; and
   if one or more of the minimum SAD values are not below a perdefined threshold, repeating the reading a segment step, the updating step and the determining step for a next segment of the reference window.

2. The method of claim 1 wherein if a certain one of the updated SAD calculations is completed for a certain sub-block of the reference window and is below a predefined threshold, using the certain sub-block of the reference window for motion estimation.

3. The method of claim 1 wherein if the updated SAD calculations are completed and are equal to or above a predefined threshold, using the determined one or more sub-blocks of the reference window for motion estimation.

4. The method of claim 1 wherein the reference window is an array of pixels and wherein, in the reading the segments step, a middle row of the array of pixels is read first and then alternating top and bottoms rows, relative to the middle row, are read in order of proximity to the middle row.

5. The method of claim 1 wherein the target block has 4 rows by 4 columns of pixels and wherein the target block is a down sampled block from a target image.

6. The method of claim 1 wherein the reference window has 20 rows by 20 columns of pixels and wherein the reference window is a down-sampled block from a reference image.

7. The method of claim 1 wherein the determined SAD calculations are weighted as a function of a previously determined sub-block having a minimum SAD calculation.

8. The method of claim 1 wherein the determined SAD calculations are weighted based upon a skip flag for any of the sub-blocks of the reference window.

9. A method for comparing a target block to a reference window in motion estimation calculations, comprising the steps of:
   determining SAD calculations as a function of pixel data of the target block and pixel data of the reference window;
   reading the target block into registers;
   reading a segment of the reference window, wherein the reference window is an array of pixels, and wherein a middle row of the array of pixels is read first and then alternating top and bottoms rows, relative to the middle row, are read in order of proximity to the middle row;
   updating the determined SAD calculations on the fly as a function of the read target block and the read segment of the reference window;
   determining one or more sub-blocks of the reference window having minimum SAD values as a function of the updated SAD calculations, wherein if a certain one of the updated SAD calculations is completed for a certain sub-block of the reference window and is below a predefined threshold, using the certain sub-block of the reference window for motion estimation; and
   if one or more of the minimum SAD values are not below the predefined threshold, repeating the reading a segment step, the updating step and the determining step for a next segment of the reference window,
   wherein if the updated SAD calculations are completed and are equal to or above the predefined threshold, using the determined one or more sub-blocks of the reference window for motion estimation.

10. The method of claim 9 wherein the reference window is an array of pixels, wherein each row of the array of pixels is partitioned into a first segment, a second segment, and a third segment, and wherein, in the reading the segments step, the order that the segments are read by the processor is as follows: the second segment, the first segment, and the third segment.

11. The method of claim 9 wherein the target block has 4 rows by 4 columns of pixels and wherein the target block is a down sampled block from a target image.

12. The method of claim 9 wherein the reference window has 20 rows by 20 columns of pixels and wherein the reference window is a down-sampled block from a reference image.

13. The method of claim 9 wherein the determined SAD calculations are weighted as a function of a previously determined sub-block having a minimum SAD calculation.

14. The method of claim 9 wherein the determined SAD calculations are weighted based upon a skip flag for any of the sub-blocks of the reference window.

15. A method for comparing a target block to a reference window in motion estimation calculations, comprising the steps of:
  determining SAD calculations as a function of the target block and the reference window;
  reading the target block into registers;
  reading a segment of the reference window;
  updating the determined SAD calculations on the fly as a function of the read target block and the read segment of the reference window;
  determining one or more sub-blocks of the reference window having minimum SAD values as a function of the updated SAD calculations, wherein if a certain one of the updated SAD calculations is completed for a certain sub-block of the reference window and is below a predefined threshold, using the certain sub-block of the reference window for motion estimation; and
  if one or more of the minimum SAD values are not below the predefined threshold, repeating the reading a segment step, the updating step and the determining step for a next segment of the reference window,
  wherein if the updated SAD calculations are completed and are equal to or above the predefined threshold, using the determined one or more sub-blocks of the reference window for motion estimation,
  wherein the reference window is an array of pixels,
  wherein each row of the array of pixels is partitioned into a first segment, a second segment, and a third segment,
  wherein, in the reading the segments step, the order that the segments are read by the processor is as follows: the second segment, the first segment, and the third segment, and
  wherein, in the reading the segments step, the segments in a middle row of the array of pixels is read first and then the alternating top and bottoms rows, relative to the middle row, are read in order of proximity to the middle row.

16. The method of claim 15 wherein the target block has 4 rows by 4 columns of pixels, wherein the target block is a down sampled block from a target image, wherein the reference window has 20 rows by 20 columns of pixels and wherein the reference window is a down-sampled block from a reference image.

17. The method of claim 15 wherein the determined SAD calculations are weighted as a function of a previously determined sub-block having a minimum SAD calculation.

18. The method of claim 15 wherein the determined SAD calculations are weighted based upon a skip flag for any of the sub-blocks of the reference window.

* * * * *